United States Patent
Jones et al.

(10) Patent No.: US 12,266,938 B2
(45) Date of Patent: Apr. 1, 2025

(54) DYNAMIC ENERGY MANAGEMENT AND COST OPTIMIZATION IN LOCAL GRIDS

(71) Applicant: Rainforest Automation, Inc., Vancouver (CA)

(72) Inventors: Richard Thomas Jones, Port Coquitlam (CA); Christopher Stanley James Tumpach, Vancouver (CA); Md. Zulfiquar Ali Bhotto, Surrey (CA); Ivan Bajic, West Vancouver (CA); Stephen William Makonin, Burnaby (CA)

(73) Assignee: Rainforest Automation, Inc., Vancouver (CA)

( * ) Notice: Subject to any disclaimer, the term of this patent is extended or adjusted under 35 U.S.C. 154(b) by 802 days.

(21) Appl. No.: 17/494,676

(22) Filed: Oct. 5, 2021

(65) Prior Publication Data

US 2022/0115872 A1    Apr. 14, 2022

Related U.S. Application Data

(60) Provisional application No. 63/090,048, filed on Oct. 9, 2020.

(51) Int. Cl.
*H02J 3/32* (2006.01)
*G05B 19/042* (2006.01)
*H02J 3/38* (2006.01)
*H02J 7/00* (2006.01)

(52) U.S. Cl.
CPC .............. *H02J 3/32* (2013.01); *G05B 19/042* (2013.01); *H02J 3/381* (2013.01); *H02J 7/0048* (2020.01); *G05B 2219/2639* (2013.01); *H02J 2300/22* (2020.01); *H02J 2300/28* (2020.01)

(58) Field of Classification Search
None
See application file for complete search history.

(56) References Cited

U.S. PATENT DOCUMENTS

| | | | | |
|---|---|---|---|---|
| 2012/0150709 | A1 * | 6/2012 | Kaji | G06Q 40/00 705/35 |
| 2020/0259358 | A1 * | 8/2020 | Hansen | H02J 7/35 |
| 2020/0307410 | A1 * | 10/2020 | Tsuda | H02J 7/007 |
| 2020/0387981 | A1 * | 12/2020 | Tinio | H02J 3/381 |
| 2024/0286515 | A1 | 8/2024 | Tumpach et al. | |

\* cited by examiner

*Primary Examiner* — Mohammad Ali
*Assistant Examiner* — Saad M Kabir
(74) *Attorney, Agent, or Firm* — Carr & Ferrell LLP

(57) ABSTRACT

Systems and methods for dynamic management of energy usage in local grids are provided. An example method is performed by a load distribution controller coupled to a power source and an energy storage device configured to accumulate power. The method includes acquiring reference levels of using energy of the power source at time slots within a time period and cost values corresponding to the reference levels, dynamically determining, based on the reference levels and the cost values, a schedule indicating charge levels of the energy storage device at the time slots within the time period, and configuring the energy storage device to charge or discharge the power the power according to the schedule. The reference levels are obtained using the Viterbi algorithm based on costs of the energy of power source at past times slots of a past time period and rates of charging and discharging the energy storage device.

21 Claims, 5 Drawing Sheets

DYNAMIC ENERGY MANAGEMENT AND COST OPTIMIZATION IN LOCAL GRIDS

CROSS REFERENCE TO RELATED APPLICATIONS

The present application claims priority of U.S. Provisional Patent Application No. 63/090,048 filed on Oct. 9, 2020, entitled "Dynamic Nanogrid Energy Management and Optimization" which is incorporated herein by reference in its entirety for all purposes.

TECHNICAL FIELD

The present disclosure relates generally to electrical grids and, more particularly, to systems and methods for dynamic management of energy usage and cost optimization in local grids.

BACKGROUND

Typically, usage of electrical energy increases with the increase of use of new technologies. The increase of electrical energy usage causes customers to spend more on the electrical energy and exerts an extra burden on the economy and natural energy sources. An intelligent energy management system (EMS) can be used to reduce usage of the electrical energy and lower expenses associated with its use in homes and commercial buildings. Current intelligent EMSs utilize weather forecast to predict future energy use. However, this approach is not efficient for optimizing energy use of the electrical energy in real time.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are systems and methods for dynamic management of energy usage and cost optimization in local grids. The present disclosure provides methods and systems for dynamic management of energy usage and cost optimization in local grids. The local grids can be located in a localized structure, such as a building, house, or the like. Exemplary embodiments of the present invention may facilitate optimizing an energy storage device, such as a battery, by controlling when to charge the energy storage device based on energy cost. In this way, energy can be pulled from a local grid at variable times to optimize for cost and provide the lowest possible energy cost to an end user within the localized structure.

According to an example embodiment, a system for dynamic management of energy usage may include at least one power source, at least one energy storage device configured to accumulate power, and a load distribution controller coupled to the power source and the energy storage device. The load distribution controller can be configured to acquire reference levels of using energy of the power source at time slots within a time period and cost values corresponding to the reference levels. The load distribution controller can dynamically determine, based on the reference levels and the cost values, a schedule indicating charge levels of the energy storage device at the time slots within the time period. The load distribution controller can configure the energy storage device to charge or discharge the power according to the schedule.

Determining the schedule may include estimating, based on the reference levels and cost values of energy from the power source, a reference cost and performing feedback loop iterations to match a value of an accumulated cost to the reference cost while modifying the charge levels. The accumulated cost can be determined based on the cost values and values of energy demand of using the energy from the power source within the time period. The values of energy demands can be determined by calculating a sum of a load demand and an amount of energy required to charge the energy storage device from a first level to a second level of the charge levels or by calculating a difference between the load demand and an amount of energy obtained by discharging the energy storage device from a third level to a fourth level of the charge levels.

The load distribution controller may include a proportional-integral-derivative (PID) controller configured to perform the feedback loop iterations. The system for dynamic management of energy usage may include a control device configured to provide the reference levels and cost values to the load distribution controller.

The reference levels can include optimized levels of energy determined based on costs of the energy of power source at past times slots of a past time period and rates of charging and discharging the least one energy storage device. The past time period can be a time period determined, based on predetermined criteria, to have the most predictive reference levels. In an example embodiment, the past time period is distanced from the time period by one year, one week, one month, and so forth. The optimized levels can be obtained by a dynamic programming algorithm. The dynamic programming algorithm may include the Viterbi algorithm.

The energy storage device may include a rechargeable battery, an electric vehicle, a thermal storage device, or a mechanical energy storage device. The power source may include a Solar panel, a wind power generator, or an electrical grid.

According to another embodiment, a method for dynamic management of energy usage and cost optimization in local grids is provided. The method can be performed by a load distribution controller coupled to at least one power source and at least one energy storage device configured to accumulate power. The method may include acquiring reference levels of using energy of the at least one power source at time slots within a time period and cost values corresponding to the reference levels. The method may also include dynamically determining, based on the reference levels and the cost values, a schedule indicating charge levels of the at least one energy storage device at the time slots within the time period. The method may also include configuring the at least one energy storage device to charge or discharge the power according to the schedule.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
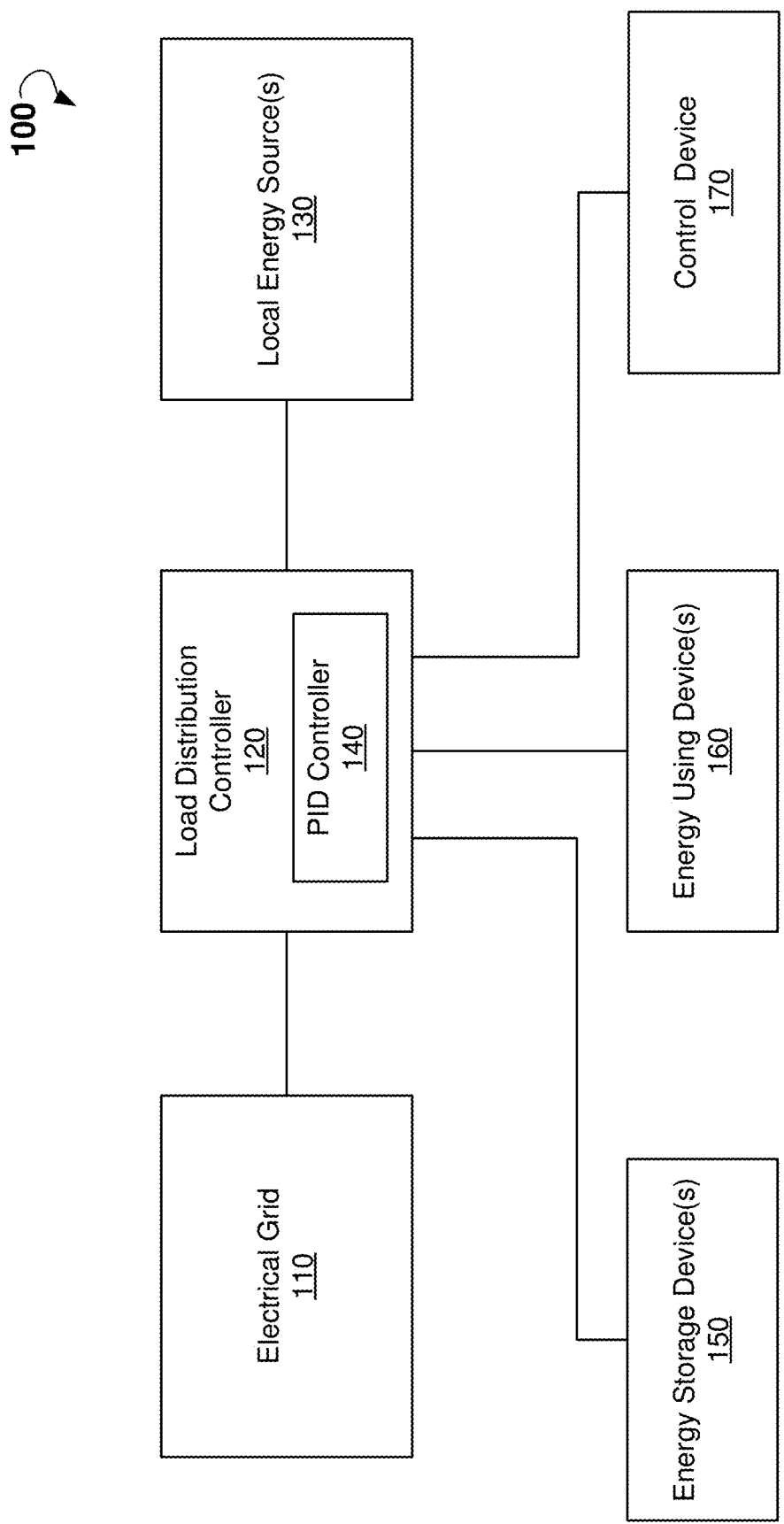
FIG. 1 is a block diagram of a system for dynamic management of energy usage and cost optimization in local grids, according to some example embodiments.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In general, the present disclosure is related to systems and methods for dynamic management of energy usage and cost optimization in local grids. Some embodiments of the present disclosure may provide technological solutions for optimizing charging and discharging of one or more energy storage devices based on usage and/or cost of energy. With the optimization techniques disclosed herein, energy usage for a structure, such as a house, building, or other local grid, can be optimized to use the least possible amount of energy and to provide the lowest possible cost solution to an end consumer.

To accomplish the dynamic management of energy usage, a Viterbi algorithm can be used in combination with a PID controller to determine an optimal solution for the lowest energy usage and/or the lowest cost of energy usage for a local grid. As used herein, the term local grid may refer to an electrical network installed in a residential structure (such as a house), a commercial structure (such as commercial building), or any other defined physical structure or boundary.

Traditional systems for management of energy usage in local grids rely on weather forecast to predict future energy usage, and provision energy usage accordingly. With embodiments of the present invention, energy usage can be provisioned in a reactive and adaptive manner, substantially in real-time, to optimize energy usage for any time increment. In some embodiments of the present disclosure, energy usage can be optimized for each hour.

Embodiments of the present disclosure can utilize a cost function. The arguments of the cost function are parameters concerning the energy production and the energy demand. The parameters can be used to regulate the charge-state of an energy storage device (such as a battery). The parameters can be varied, such that a minimal amount of energy is purchased from an electrical grid. The optimal parameters can be determined by the Viterbi algorithm. The optimal value of the cost function can correspond to the lowest energy usage and/or the lowest cost of energy usage. The optimal value of the cost function can be referred to as a "Viterbi cost". The optimal parameters corresponding to the optimal value of the cost function can be referred as "Viterbi path". In some embodiments, the optimal parameters may include setpoints for charge levels of energy storage device within next time periods, for example next hour.

A PID based load distribution controller can be further used in conjunction with the Viterbi algorithm to distribute the energy production and energy demand by controlling the charge/discharge of an energy storage device. The PID controller may follow the optimal parameters (setpoints for the charge levels of the energy storage device), that is "Viterbi path", so that the cost of the energy purchased from the electrical gird approaches the "Viterbi cost". In this way, the PID based load distribution controller can control the charging or discharging of an energy storage device based on an amount of energy pulled from the electrical grid, a type of energy pulled from the electrical grid, or timing of energy pulled from the electrical grid. This way, the amount of energy usage or cost of energy usage can be minimized to an optimal level.

According to an example embodiment, a system for dynamic energy management of energy usage may include at least one power source, at least one energy storage device configured to accumulate power, a control device, and a PID based load distribution controller. The PID based load distribution controller can be coupled to the at least one power source, the at least one energy storage device, and the control device. The PID based load distribution controller can acquire, from the control device, reference levels of using energy of the power source at time slots within a time period and cost values corresponding to the reference levels.

The reference levels can be obtained by the Viterbi algorithm based on costs of the energy of the power source at past times slots of a past time period and rates of charging and discharging of at least one energy storage device. The PID based load distribution controller can dynamically determine, based on the reference levels and cost values, a schedule indicating charge levels of the energy storage device at the time slots within the time period. Determining the schedule may include estimating a reference cost based on reference levels and the cost values of energy from the power source.

The PID based load distribution controller may perform feedback loop iterations to match a value of an accumulated cost to the reference cost while modifying the charge levels, wherein the accumulated cost is determined based on the cost values and values of energy demand of using the energy from the power source within the time period. The values of the energy demands can be calculated as a sum of a load demand and an amount of energy required to charge the energy storage device from a first level to a second level or as a difference between the load demand and an amount of the energy obtained by discharging the energy storage device from a third level to a fourth level. The PID based load distribution controller can configure the at least one energy storage device to charge or discharge the power according to the schedule.

Referring now to the drawings, FIG. 1 is a block diagram of a system 100 for dynamic management of energy usage and cost optimization in local grids, according to some example embodiments. The system 100 is also referred herein to as EMS 100. The system 100 may include an electrical grid 110, a load distribution controller 120, one or more local energy source(s) 130, one or more energy storage device(s) 150, one or more energy using device(s) 160, and a control device 170. The load distribution controller may include a PID controller 140.

The PID controller 140 can be controlled via software executed by a processor located in control device 170. The control device 170 can include a physical or virtual gateway device installed in a building. In other embodiments, the PID controller 140 can be controlled via software operating on a smart device already present within a building, such a smart electricity meter from an electric utility company.

The load distribution controller 120 can be in communication with the energy storage device(s) 150 and one or more energy using device(s) 160. The energy using device(s) 160 may include any device present in a residential or commercial structure that needs energy to operate, such as an appliance in a house, a computer, a smart device, a security system, and so forth. The energy storage device(s) 150 can include any device capable of storing energy for later use and having a two-way energy flow. For example, an energy storage device may be a battery, an electric vehicle, a thermal energy storage (for example a hot water tank), a mechanical energy storage (such as a flywheel), and so forth.

In some embodiments of the present disclosure, the load distribution controller 120 may direct when and how much energy is to pull from the electrical grid 110 and the local energy source(s) 130, and the energy storage device(s) 150. The electrical grid 110 can be managed by an electric utility company. A consumer may purchase different types of energy from the electric utility company operating the electrical grid 110. That is, the electric utility company may provide a consumer with an option to purchase energy from a renewable energy source (e.g., solar, wind, and water), or from a non-renewable energy source (such as a fossil fuel like coal). Further, the electric utility company may provide the consumer with choices of specific energy sources to utilize for the electric power that is provided to the building. In some embodiments, the controller may direct the energy source to be utilized by the energy storage device(s) 150 and the energy using device(s) 160, based on availability and cost of the energy from the electrical grid 110.

The local energy source(s) 130 may include a solar panel on a house, a wind generator, a micro hydroelectric power plant, and a power generator utilizing natural gas, diesel, or petrol. This way, the load distribution controller 120 may influence where electrical power is directed and control the amount and timing of electrical power usage.

The load distribution controller 120 may also be in communication with one or more energy using devices present in a residential or commercial structure and direct an energy source for the energy using devices to fulfill energy requirements. For example, the load distribution controller 120 may direct a smart thermostat in a house to use energy from the energy storage device(s) 150, directly from the local energy source(s) 130, such as a solar panel attached to the house, or from the electrical grid 110. In other embodiments, the energy using device(s) 160 can pull energy from the energy storage device directly, with load distribution controller 120 only managing the charging and discharging of the energy storage device(s) 150.

Figure 2:
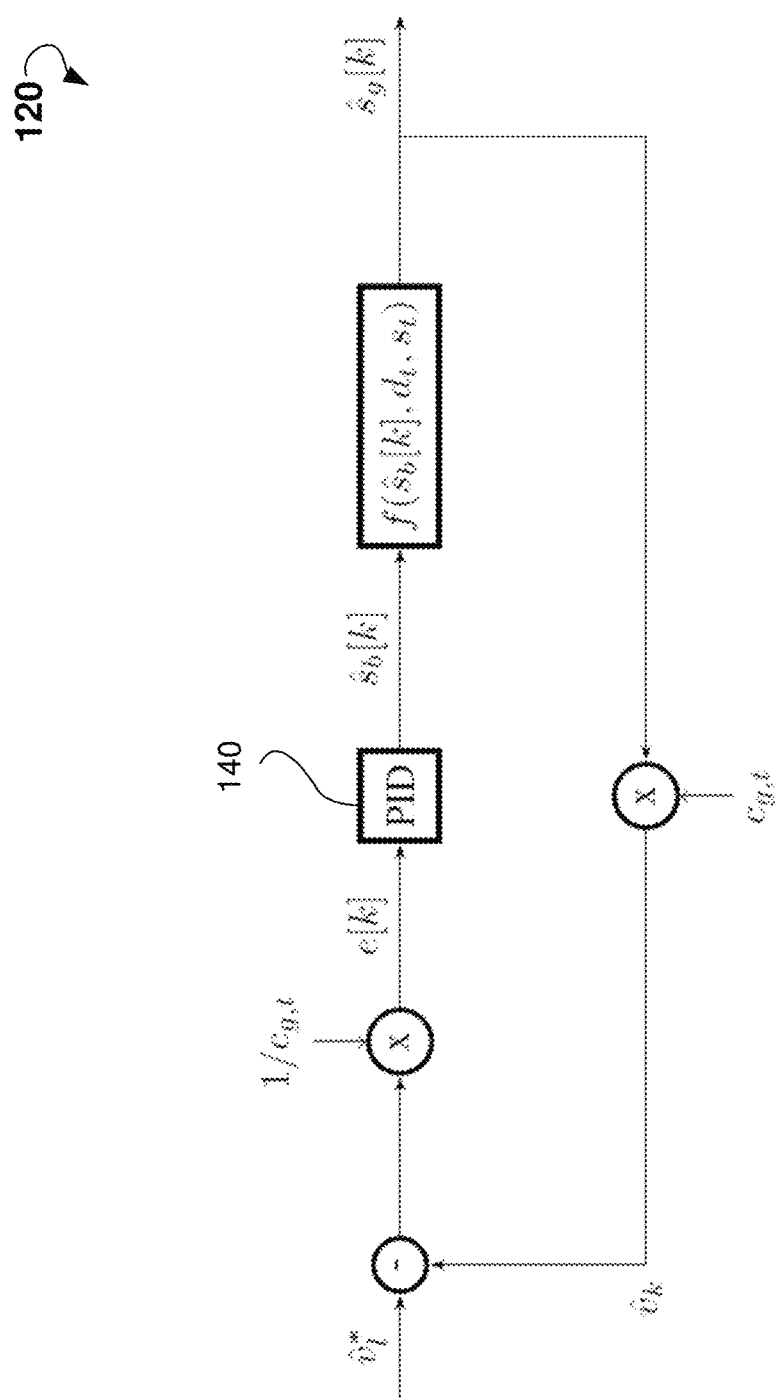
FIG. 2 is a schematic showing functionality of a PID controller, according to some example embodiments.

FIG. 2 is a schematic showing functionality of a PID controller 140, according to some example embodiments. The PID controller 140 can estimate an approximation for the Viterbi path based on an initial guess of the Viterbi cost. The Viterbi cost and Viterbi path can be determined based on historical data. The Viterbi path may include charge levels of the energy storage device(s) 150 corresponding to optimal values $s_{g,t}^*$ of usages of energy of the electrical grid 110 at times $t=1, 2, \ldots, T$. The details for determining the Viterbi path are described in Appendices A, B, and C of the Specification. The subject matter of the Appendices A, B, and C is incorporated herein by reference for all purposes.

The PID controller 140 may receive the optimal values $s_{g,t}^*$ (also referred to as reference levels of using energy from the electrical grid 110) at times $t=1, 2, \ldots, T$. The time T may correspond to the end of next hour. As mentioned above, the optimal values $s_{g,t}^*$ can be determined based on the historical data, for example, data obtained in substantially the same time period from previous years. The optimal values $s_{g,t}^*$ and current cost of the energy from the electrical grid 110 can be determined and stored by the control device 170 or in cloud-based computing resource(s). The control device 170 may provide the optimal values $s_{g,t}^*$ and the current cost of the energy to the PID controller 140 periodically, for example, at the beginning of each hour.

The time steps $t=1, 2, \ldots, T$ can be partitioned into $T/\omega$ number of time slots and the l-th time slot is given as $T_l = \{t+(l-1)\omega, t+(l-1)\omega+1, \ldots, t+(l-1)\omega-1\}$ for $l=1, 2, \ldots, T/\omega$. The optimal cost of energy from the electrical grid 110 corresponding to the Viterbi path in the l-th time slot can obtained as $\Sigma_{t \in T_l} c_{g,t} s_{g,t}^*$, where $c_{g,t}$ is the cost of the energy from the electrical grid 110 at $t \in T_l$. An approximation of the average value of the cost of the energy from the electrical grid 110 is $$\hat{v}_l^* \approx \frac{1}{\omega} \sum_{t \in T_l} c_{g,t} s_{g,t}^*.$$

The $\hat{v}_l^*$ can be used by the PID controller 140 as a reference cost for all $t \in T_l$ as shown in FIG. 2. This way, the PID controller 140 can better estimate the Viterbi path. If the PID controller 140 converges to $\hat{v}_l^*$ in K iterations for each $t \in T_l$, the accumulated cost at the end of $T_l$ will be approximately equal to the optimal Viterbi cost $\Sigma_{t \in T_l} c_{g,t} s_{g,t}^*$.

The PID controller 140 may determine charge levels $b_t$ and usage $s_{g,t}$ of energy of the electrical grid 110 from the charge levels $b_{t-1}$ and usage $s_{g,t-1}$, and load demand de using an update formula. The load distribution controller 120 may follow the charge levels $b_t$, where $t=1, 2, \ldots, T$ to minimize usage of energy of the electrical grid 110 and, thereby, minimize the cost of the energy.

In some embodiments, the charge levels $b_t$, where $t=1, 2, \ldots, T$ can be adjusted on other factors, such as availability and cost of energy provided by local energy source(s) 130, external temperature and weather for the location of the local grid, internal temperature data given by a smart thermostat connected to a home the local grid is installed in, analytic data on customer behavior patterns, records from the customer calendar, and real-time user location data. The customer can provide voluntary access to the calendar and location data. The temperature data, the customer calendar data, and customer location data can be provided to the control device 170 in real time. The control device 170 may adjust the reference levels of using energy from the electrical grid 110 based on the temperature data, the customer calendar data, and customer location data and provide the adjusted reference levels to the PID controller 140.

It should be noted that the use of current end-of-hour data (e.g., end-of-hour energy consumption, Solar panel data, as cost data) as known can be inappropriate in estimation of what the state of battery in the energy storage device(s) 150 should be by the end of the same hour. Although battery charge/discharge rate limits can be implemented (such that the battery does not charge or discharge too much over a given hour), taking end-of-hour data as known implies that adjustment to the battery state can only occur when these values are "certain". This will likely require a charge/discharge rate that exceeds what the battery can handle in the sense of energy charged/discharged per second, rather than per hour.

Additionally, utilities will often bill differently for customers importing energy as opposed to exporting energy, and the window over which this is averaged is typically around 15 minutes. This means that cost calculations would potentially be highly inaccurate if the battery were allowed to adjust its state after the consumption/solar data are "certain", even if the rate at which it charges/discharges over this smaller timeframe is physically reasonable, given a particular battery system.

Therefore, some further embodiments may include next-hour prediction systems for the total home consumption, the solar panel availability, and potentially the energy cost. As a result, predictive methods may ensure that the load distribution controller can operate in a fully causal way, without using future or current end-of-hour data.

Further embodiments may utilize internal access to sub-hourly user consumption data. This way, an initial battery setpoint for the end of the hour can be computed given initial estimates with predicted consumption data, solar panel data, and cost data. This allows for smooth battery charging/discharging to maximize battery lifetime. As more sub-hourly data are acquired, refined predictions for end-of-hour cumulative consumption can be attained using various established techniques. These refined estimates may provide a mechanism to adaptively update the end-of-hour battery setpoint and adjust the charge/discharge rate to smoothly approach the value to which the load distribution controller converges.

In an example embodiment, the reference cost may be adjusted using sub-hourly consumption data and data provided by one or more data sources. The one or more data sources may include peripheral devices such as smart thermostats or user devices connected, for example, via WiFi, to the electrical network.

Some embodiments may allow applying the Viterbi algorithm directly (or another dynamic programming optimization method) by using the predicted consumption data, solar panel data, and cost data. In these embodiments, the setpoints for battery can be determined without a PID controller.

Figure 3:
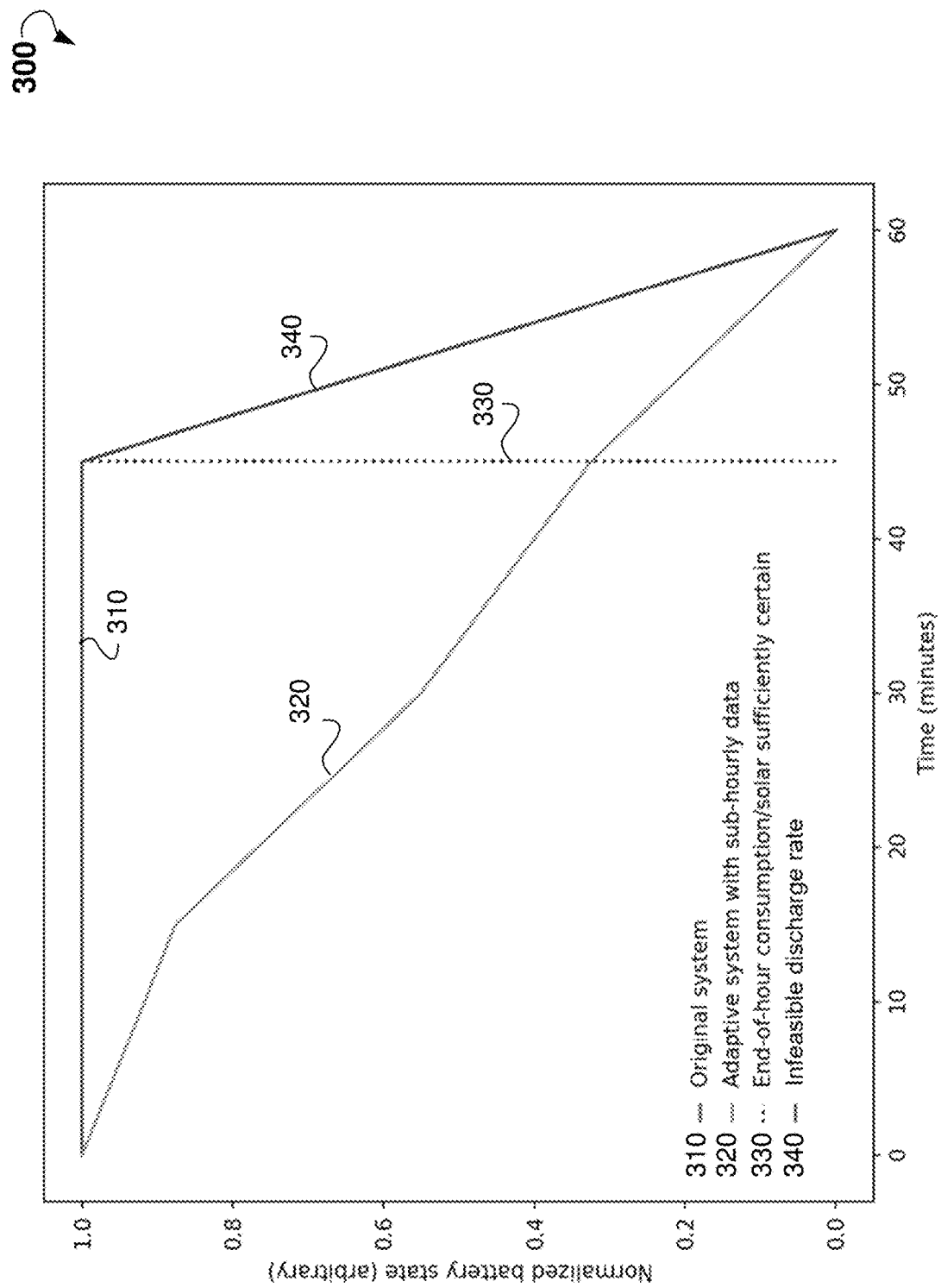
FIG. 3 shows plots of a normalized battery state in different EMSs, according to some example embodiments.

FIG. 3 shows plots 300 of a normalized battery state in different EMSs, according to some example embodiments. The graph 310 depicts the normalized battery state in an EMS with a PID control. The graph 320 depicts the normalized battery state in an EMS with the adaptive control utilizing sub-hourly data. The graph 330 depicts the normalized battery state in an EMS utilizing end-of-hour consumption and solar data. The graph 340 depicts infeasible discharge rate.

Figure 4:
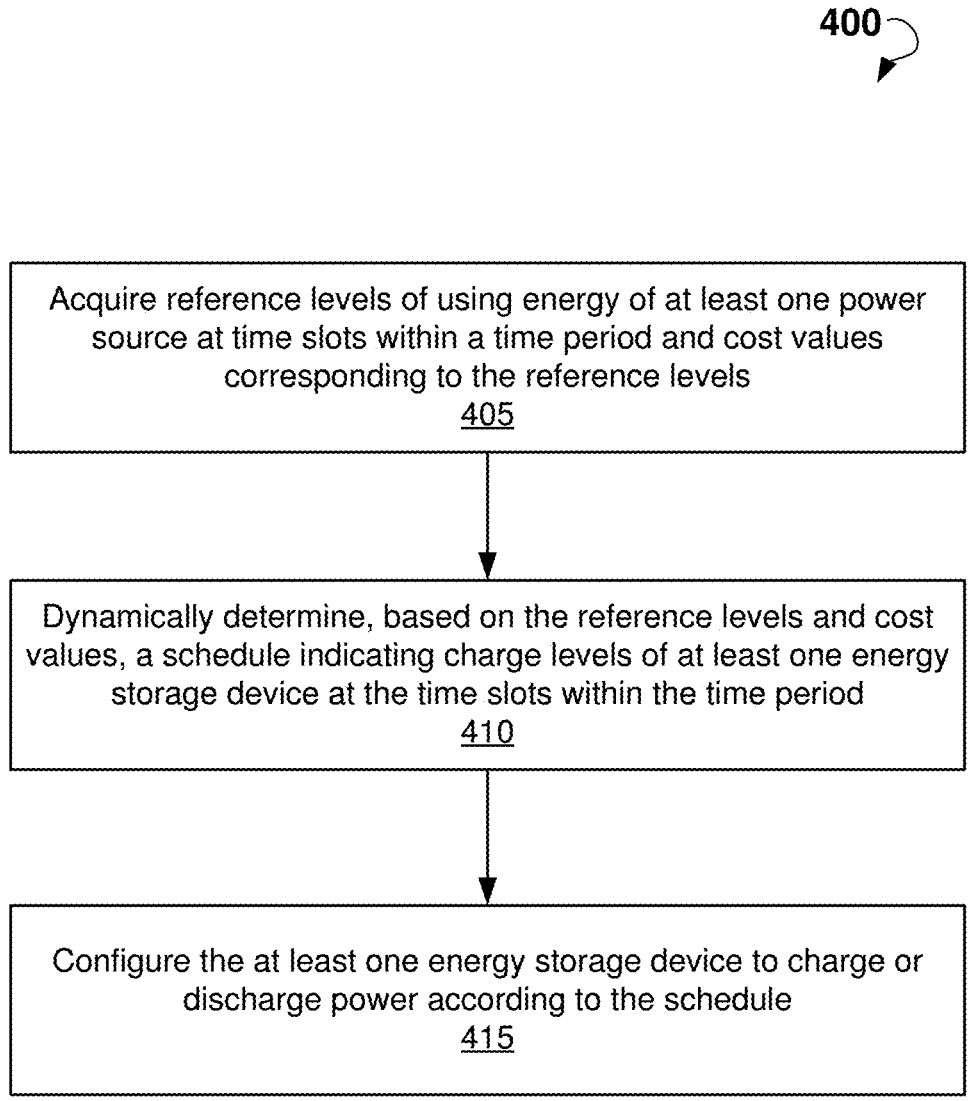
FIG. 4 is a flow chart showing a method for dynamic management of energy usage and cost optimization in local grids, according to an example embodiment.

FIG. 4 is a flow chart of a method for dynamic management of energy usage and cost optimization in local grids, according to an example embodiment. The method 400 can be performed by the load distribution controller 120 of system 100 described above with reference to FIG. 1.

The method 400 may commence in block 405 with acquiring reference levels of using energy of at least one power source at time slots within a time period and cost values corresponding to the reference levels. The reference levels can be optimized levels of energy determined based on costs of energy power source at past times slots of a past time period and rates of charging and discharging at least one energy storage device. The energy storage device may include a rechargeable battery, an electric vehicle, a thermal storage device, or a mechanical energy storage device. The power source may include an electrical grid, a solar panel, a wind power generator, a generator utilizing a natural gas, diesel, or petrol.

The past time period can be a time period determined, based on predetermined criteria, to have the most predictive reference levels. In an example embodiment, the past time period is distanced from the time period by one year, one week, one month, and so forth. The optimized levels can be obtained by a dynamic programming algorithm. The dynamic programming algorithm may include the Viterbi algorithm.

In block 410, the method 400 may dynamically determine, based on the reference levels and the cost values, a schedule indicating charge levels of the at least one energy storage device at the time slots within the time period. The determination of the schedule may include estimating a reference cost based on the reference levels and the cost values of energy from the at least one power source. The determination of the schedule may then include performing feedback loop iterations to match a value of an accumulated cost to the reference cost while modifying the charge levels. The accumulated cost can be determined based on the cost values and values of energy demand of using the energy from the power source within the time period. The values of energy demands can include a sum of a load demand and an amount of energy required to charge the at least one energy storage device from a first level to a second level or a difference between the load demand and an amount of energy obtained by discharging the energy storage device from a third level to a fourth level.

The load distribution controller may include a PID controller configured to perform the feedback loop iterations. The reference levels and the cost values can be provided to the load distribution controller by a control device. In block 415, the method 400 may configure the at least one energy storage device to charge or discharge the power according to the schedule.

Figure 5:
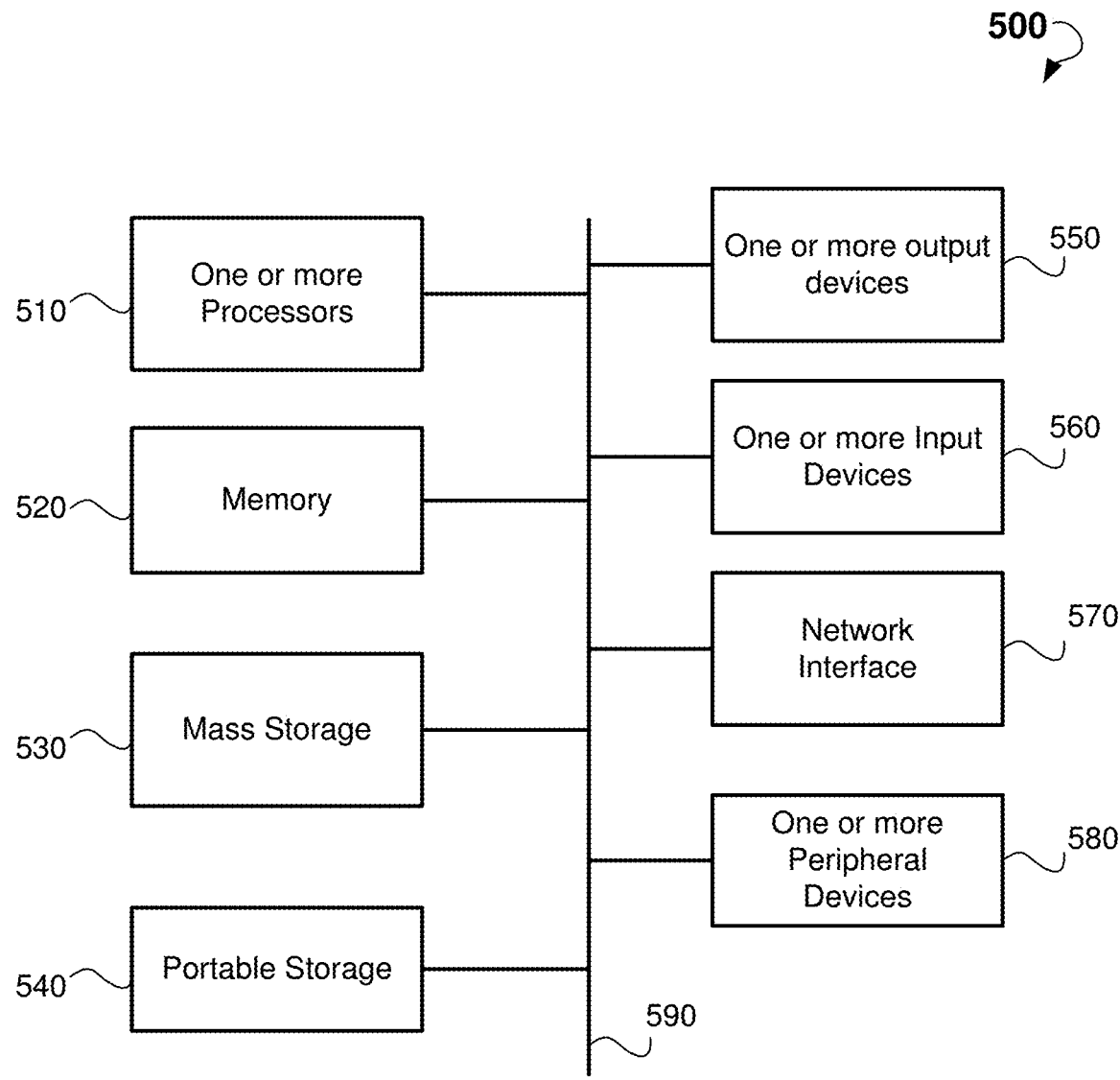
FIG. 5 shows a computing system suitable for implementing embodiments of the present disclosure.

FIG. 5 illustrates an exemplary computing system 500 that can be used to implement embodiments described herein. The computing system 500 can be implemented in the contexts of control device 170 and load distribution controller 120. The exemplary computing system 500 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth® radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a Universal Serial Bus.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, systems and methods for dynamic management of energy usage and cost optimization in local grids are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for dynamic management of energy usage, the system comprising:
    at least one power source;
    at least one energy storage device configured to accumulate power; and
    a load distribution controller coupled to the at least one power source and the at least one energy storage device, the load distribution controller being configured to:

acquire reference levels of using energy of the at least one power source at time slots within a time period and cost values corresponding to the reference levels;

dynamically determine, based on the reference levels and the cost values, a schedule indicating charge levels of the at least one energy storage device at the time slots within the time period, the determining the schedule including:

estimating, based on the reference levels and the cost values of energy from the at least one power source, a reference cost; and performing feedback loop iterations to match a value of an accumulated cost to the reference cost while modifying the charge levels, wherein the accumulated cost is determined based on the cost values and values of energy demand of using the energy from the at least one power source within the time period, the values of energy demand being one of the following:

a sum of a load demand and an amount of energy required to charge the at least one energy storage device from a first level to a second level of the charge levels; and a difference between the load demand and an amount of energy obtained by discharging the at least one energy storage device from a third level to a fourth level of the charge levels; and configure the at least one energy storage device to charge or discharge the power according to the schedule.

2. The system of claim 1, wherein the load distribution controller includes a proportional-integral-derivative controller configured to perform the feedback loop iterations.

3. The system of claim 1, further comprising a control device configured to provide the reference levels and the cost values to the load distribution controller.

4. The system of claim 1, wherein the reference levels are optimized levels of energy determined based on costs of the energy of the at least one power source at past time slots of a past time period and rates of charging and discharging the at least one energy storage device.

5. The system of claim 4, wherein the past time period is a period determined, based on predetermined criteria, to have the most predictive reference levels.

6. The system of claim 4, wherein the optimized levels of energy are obtained by a dynamic programming algorithm.

7. The system of claim 6, wherein the dynamic programming algorithm is Viterbi algorithm.

8. The system of claim 1, wherein the at least one energy storage device includes at least one of a rechargeable battery, an electric vehicle, a thermal storage device, and a mechanical energy storage device.

9. The system of claim 1, wherein the at least one power source includes at least one of a Solar panel, a wind power generator, and an electrical grid.

10. A method for dynamic management of energy usage, the method being performed by a load distribution controller coupled to at least one power source and at least one energy storage device configured to accumulate power, the method comprising:

acquiring reference levels of using energy of the at least one power source at time slots within a time period and cost values corresponding to the reference levels;

dynamically determining, based on the reference levels and the cost values, a schedule indicating charge levels of the at least one energy storage device at the time slots within the time period, the determining the schedule including:

estimating, based on the reference levels and the cost values of energy from the at least one power source, a reference cost; and performing feedback loop iterations to match a value of an accumulated cost to the reference cost while modifying the charge levels, wherein the accumulated cost is determined based on the cost values and values of energy demand of using the energy from the at least one power source within the time period, the values of energy demand being one of the following:

a sum of a load demand and an amount of energy required to charge the at least one energy storage device from a first level to a second level of the charge levels; and a difference between the load demand and an amount of energy obtained by discharging the at least one energy storage device from a third level to a fourth level of the charge levels; and configuring the at least one energy storage device to charge or discharge the power according to the schedule.

11. The method of claim 10, wherein the load distribution controller includes a proportional-integral-derivative controller configured to perform the feedback loop iterations.

12. The method of claim 10, further comprising providing, by a control device, the reference levels and the cost values to the load distribution controller.

13. The method of claim 10, further comprising adjusting the reference cost using sub-hourly consumption data and data provided by one or more data sources.

14. The method of claim 10, wherein the reference levels are optimized levels of energy determined based on costs of the energy of the at least one power source at past time slots of a past time period and rates of charging and discharging the at least one energy storage device.

15. The method of claim 14, wherein the past time period is a period determined, based on predetermined criteria, to have a most predictive reference levels.

16. The method of claim 14, wherein the optimized levels of energy are obtained by a dynamic programming algorithm.

17. The method of claim 10, wherein:

the at least one energy storage device includes at least one of a rechargeable battery, an electric vehicle, a thermal storage device, and a mechanical energy storage device; and the at least one power source includes at least one of a Solar panel, a wind power generator, and an electrical grid.

18. A system for dynamic energy management of energy usage, the system comprising:

at least one power source;

at least one energy storage device configured to accumulate power;

a control device; and a proportional-integral-derivative (PID) based load distribution controller coupled to the at least one power source, the at least one energy storage device, and the control device, the PID based load distribution controller being configured to:

acquire, from the control device, reference levels of using energy of the at least one power source at time slots within a time period and cost values corresponding to the reference levels, wherein the reference levels are obtained by Viterbi algorithm based on costs of the energy of the at least one power source at past time slots of a past time period and rates of charging and discharging the at least one energy storage device;

dynamically determine, based on the reference levels and the cost values, a schedule indicating charge levels of the at least one energy storage device at the time slots within the time period, wherein the determining the schedule includes:

estimating, based on the reference levels and the cost values of energy from the at least one power source, a reference cost; and performing feedback loop iterations to match a value of an accumulated cost to the reference cost while modifying the charge levels, wherein the accumulated cost is determined based on the cost values and values of energy demand of using the energy from the at least one power source within the time period, the values of energy demand being one of the following:

a sum of a load demand and an amount of energy required to charge the at least one energy storage device from a first level to a second level of the charge levels; and a difference between the load demand and an amount of energy obtained by discharging the at least one energy storage device from a third level to a fourth level of the charge levels; and configure the at least one energy storage device to charge or discharge the power according to the schedule.

19. The system of claim 3, wherein the control device includes a physical or virtual gateway device installed in a building.

20. The method of claim 12, wherein the control device includes a physical or virtual gateway device installed in a building.

21. The system of claim 18, wherein the control device includes a physical or virtual gateway device installed in a building.

* * * * *